United States Patent
Wu

(10) Patent No.: US 8,666,415 B2
(45) Date of Patent: Mar. 4, 2014

(54) METHOD FOR CANCELING CALL INITIATION IN RADIO ACCESS TECHNOLOGY CHANGE

(75) Inventor: Chih-Hsiang Wu, Taoyuan County (TW)

(73) Assignee: HTC Corporation, Taoyuan, Taoyuan County (TW)

(*) Notice: Subject to any disclaimer, the term of this patent is extended or adjusted under 35 U.S.C. 154(b) by 0 days.

(21) Appl. No.: 13/412,631

(22) Filed: Mar. 6, 2012

(65) Prior Publication Data

US 2012/0231793 A1    Sep. 13, 2012

Related U.S. Application Data

(60) Provisional application No. 61/449,727, filed on Mar. 7, 2011.

(51) Int. Cl.
H04W 36/00    (2009.01)

(52) U.S. Cl.
USPC ........... 455/436; 455/525; 455/437; 370/328; 370/331

(58) Field of Classification Search
USPC .............. 455/436, 404.1, 440, 437, 442, 444, 455/438, 441, 451, 515, 456.1, 67.11, 553; 370/331, 328, 335, 352
See application file for complete search history.

(56) References Cited

U.S. PATENT DOCUMENTS

| | | | | |
|---|---|---|---|---|
| 8,340,023 | B2* | 12/2012 | Watfa et al. | 370/328 |
| 2001/0021650 | A1* | 9/2001 | Bilgic | 455/418 |
| 2003/0139184 | A1* | 7/2003 | Singh et al. | 455/436 |
| 2007/0004445 | A1* | 1/2007 | Dorsey et al. | 455/525 |
| 2008/0304454 | A1* | 12/2008 | Zhong et al. | 370/331 |
| 2009/0280812 | A1* | 11/2009 | Cheng et al. | 455/436 |
| 2010/0061337 | A1* | 3/2010 | Hallenstal et al. | 370/331 |
| 2010/0113024 | A1* | 5/2010 | Wu | 455/436 |
| 2010/0172301 | A1* | 7/2010 | Watfa et al. | 370/328 |
| 2010/0234026 | A1* | 9/2010 | Tenny et al. | 455/436 |
| 2010/0279648 | A1* | 11/2010 | Song et al. | 455/404.1 |
| 2013/0064219 | A1* | 3/2013 | Siomina et al. | 370/331 |

OTHER PUBLICATIONS

3GPP TS 23.272 V10.2.1 3rd Generation Partnership Project; Technical Specification Group Services and System Aspects; Circuit Switched (CS) fallback in Evolved Packet System (EPS); Stage 2 (Release 10), Jan. 2011.

3GPP TS 24.008 V10.1.0 3rd Generation Partnership Project; Technical Specification Group Core Network and Terminals; Mobile radio interface Layer 3 specification; Core network protocols; Stage 3 (Release 10), article 5.4, Dec. 2010.

3GPP TS 25.331 V10.2.0 3rd Generation Partnership Project; Technical Specification Group Radio Access Network; Radio Resource Control (RRC); Protocol specification (Release 10), articles 8.1.3.5a and 8.5.2, Dec. 2010.

(Continued)

*Primary Examiner* — Mahendra Patel

(74) *Attorney, Agent, or Firm* — Winston Hsu; Scott Margo

(57) ABSTRACT

A method for canceling a cell initiation in radio access technology, hereafter called RAT, change for a mobile device is disclosed. The method comprises initiating a call in a first RAT, receiving a command redirecting the mobile device to a second RAT, moving from the first RAT to the second RAT in response to the command, and canceling the call by aborting a connection establishment to the second RAT before establishing a connection to the second RAT when the mobile device moves to the second RAT.

7 Claims, 5 Drawing Sheets

(56) References Cited

OTHER PUBLICATIONS

3GPP TS 36.331 V10.0.0 3rd Generation Partnership Project; Technical Specification Group Radio Access Network; Evolved Universal Terrestrial Radio Access (E-UTRA); Radio Resource Control (RRC); Protocol specification (Release 10), Dec. 2010.
3GPP TS 34.123-1 V9.3.0, Section 10.1.2: Establishment of an outgoing call, Dec. 2010.

* cited by examiner

METHOD FOR CANCELING CALL INITIATION IN RADIO ACCESS TECHNOLOGY CHANGE

CROSS REFERENCE TO RELATED APPLICATIONS

This application claims the benefit of U.S. Provisional Application No. 61/449,727, filed on Mar. 7, 2011 and entitled "Method and Apparatus for canceling a call initiation in inter system change in a wireless communication system", the contents of which are incorporated herein in their entirety.

BACKGROUND OF THE INVENTION

1. Field of the Invention

The application relates to a method utilized in a wireless communication system, and more particularly, to a method for canceling a call initiation in radio access technology change in a wireless communication system.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

Moreover, inter-radio access technology (inter-RAT) mobility involves transfer of a connection or mobility between a UE and a network from one RAT (e.g. the LTE system) to another RAT, such as Global System for Mobile communications (GSM)/Global Packet Radio Service (GPRS), Universal Mobile Telecommunications System (UMTS), or Code Division Multiple Access (CDMA) system. However, the applicant notices that a UE may encounter problems associated to the inter-RAT change as below based on a direct image on a basis of the prior art LTE system and UMTS system.

For example, a UE in the LTE system initiates a cell by circuit-switched fallback (CS fallback). The CS fallback capable UE supports access to E-UTRAN as well as access to the CS domain over UTRAN. The UE may receive a command from the E-UTRAN, e.g. a RRC connection release message or mobility from EUTRA command (containing cell change order), which redirects the UE to the UTRAN. Before the call is established successfully, the UE cancels initiating the call. In this situation, the UE can only clear the call by sending a DISCONNECT message for call clearing, as specified in section 5.4.3 of 3GPP TS 24.008. However, the DISCONNECT message can only be sent after the UE establishes the connection with the UTRAN. An establishment of the connection takes time and consumes transmission power.

SUMMARY OF THE INVENTION

The application discloses a method for canceling a call initiation in radio access technology change to solve the abovementioned problem.

The present invention discloses a method for canceling a cell initiation in radio access technology, hereafter called RAT, change for a mobile device. The method comprises initiating a call in a first RAT, receiving a command redirecting the mobile device to a second RAT, moving from the first RAT to the second RAT in response to the command, and canceling the call by aborting a connection establishment to the second RAT before establishing a connection to the second RAT when the mobile device moves to the second RAT.

The present invention further discloses a method for canceling a cell initiation in radio access technology, hereafter called RAT, change for a mobile device. The method comprises initiating a call in a first RAT, receiving a command redirecting or handing over the mobile device to a second RAT, moving from the first RAT to the second RAT in response to the command, establishing a connection to the second RAT, and canceling the call by sending a signaling connection release indication message or an connect management (CM) service abort message to a network of the wireless communication system when the connection to the second RAT is established, whereby the network releases the connection to the second RAT when receiving the signaling connection release indication message or the CM service abort message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
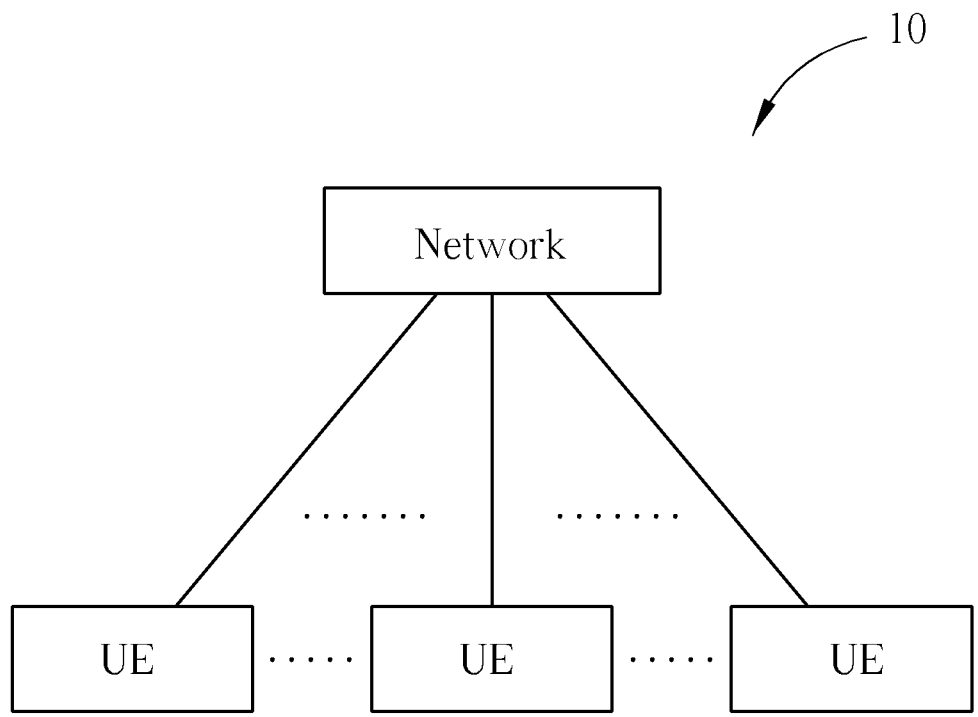
FIG. 1 illustrates a schematic diagram of an exemplary wireless communication system.

Please refer to FIG. 1, which is a schematic diagram of a wireless communication system 10. The wireless communication system 10 is a Long-Term Evolution (LTE) system or other mobile communication systems, and is briefly composed of a network and a plurality of user equipments (UEs). In FIG. 1, the network and the UEs are simply utilized for illustrating the structure of the wireless communication system 10. Practically, the network may be an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
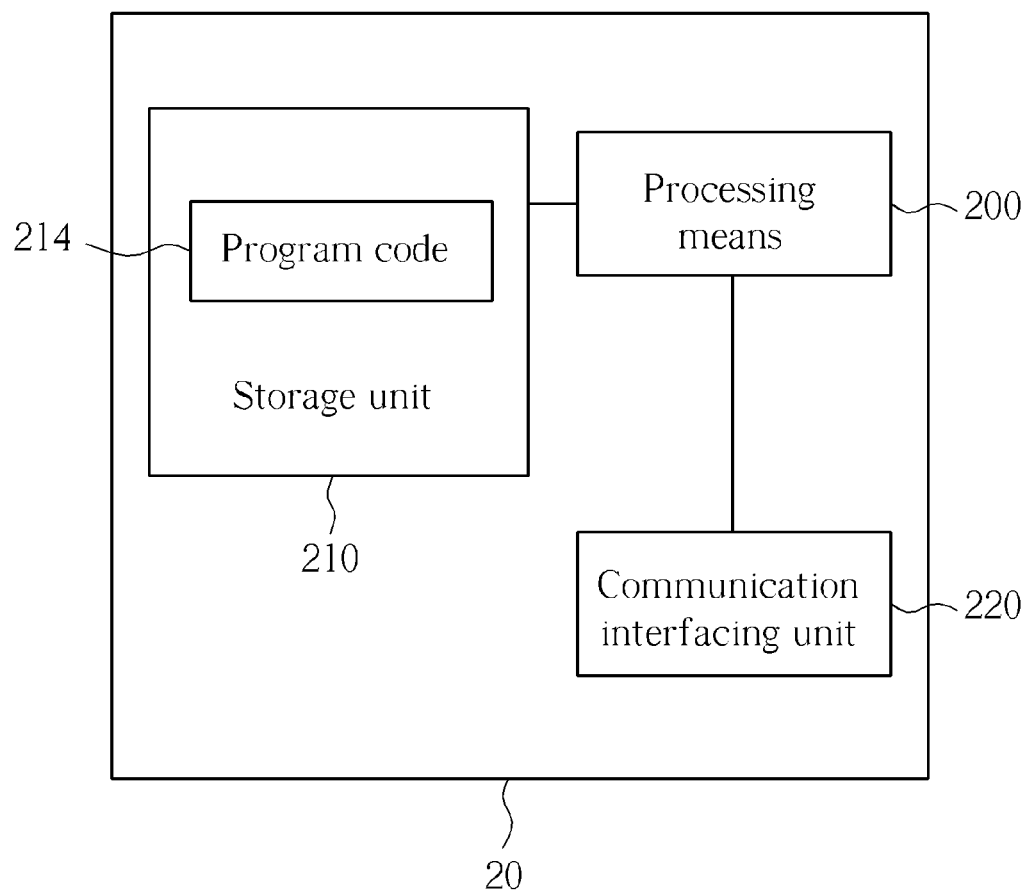
FIG. 2 illustrates a schematic diagram of an exemplary communication device.

FIG. 2 illustrates a schematic diagram of an exemplary communication device 20. The communication device 20 can be the UE shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
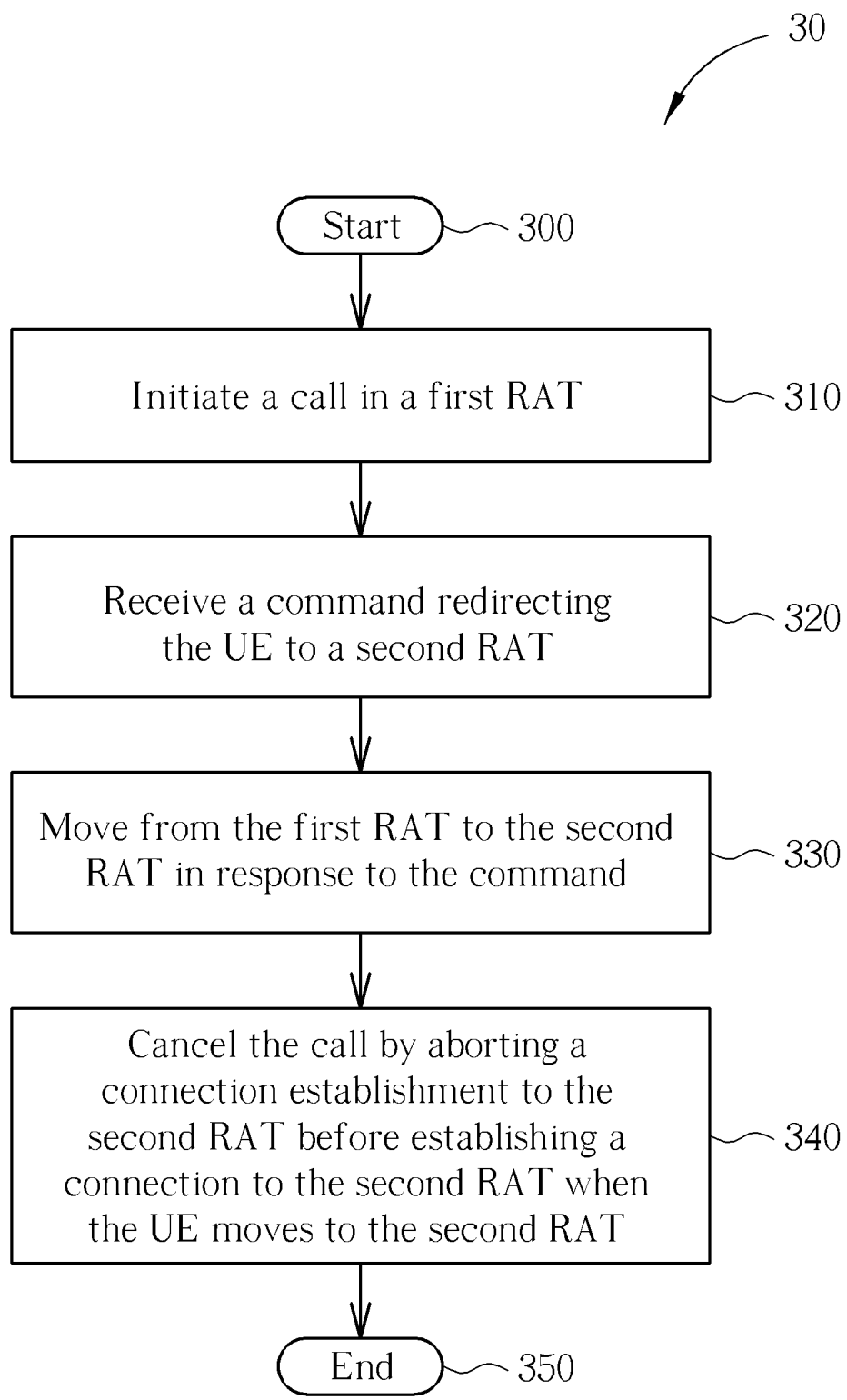
FIG. 3 is a flowchart of an exemplary process.

Please refer to FIG. 3, which illustrates a flowchart of an exemplary process 30. The process 30 is utilized in a UE for call clearing in inter-radio access technology (inter-RAT) change. The process 30 can be compiled into the program code 214 and includes the following steps:

Step 300: Start.

Step 310: Initiate a call in a first RAT.

Step 320: Receive a command redirecting the UE to a second RAT.

Step 330: Move from the first RAT to the second RAT in response to the command.

Step 340: Cancel the call by aborting a connection establishment to the second RAT before establishing a connection to the second RAT when the UE moves to the second RAT.

Step 350: End.

According to the process 30, the UE initiates the call in the first RAT and moves to the second RAT for the call due to a command received from the first RAT, which redirects the UE to the second RAT by selecting a cell of the second RAT to camp on when the UE goes to idle mode in the first RAT. The UE cancels the call initiation by not establishing a radio resource control (RRC) connection to the cell of the second RAT, so that the UE does not wait to send a DISCONNECT message until the UE has established the RRC connection with the cell of the second RAT, to speed up the call clearing. In addition, time for establishing the RRC connection is saved, and power consumption is reduced.

Figure 4:
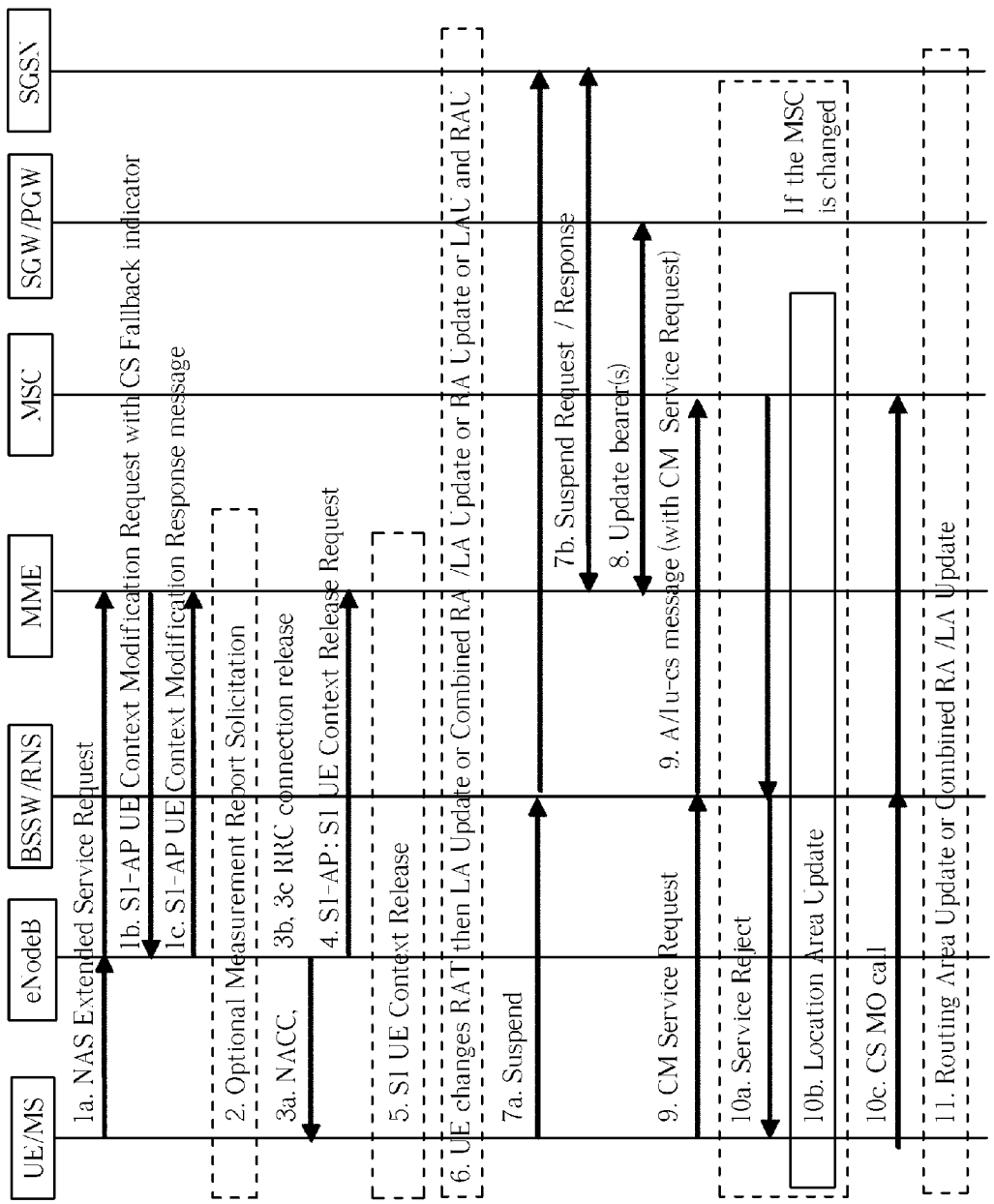
FIG. 4 illustrates a schematic diagram of a circuit-switch call request.

Take an example associated to the call clearing. Please refer to FIG. 4, which illustrates a schematic diagram of a circuit-switch (CS) call request. A UE designed for the LTE system initiates a call by CS fallback in an E-UTRAN cell. In FIG. 4, the UE sends a NAS Extended Service Request for mobile originating CS fallback to the MME (step 1a). The MME sends an S1-AP UE Context Modification Request (CS Fallback Indicator, LAI) message to the eNB (step 1b). This message indicates to the eNB that the UE should be moved to legacy network (i.e. UTRAN/GERAN). In addition, the eNB may optionally solicit a measurement report from the UE to determine the target GERAN/UTRAN cell to which the redirection procedure will be performed (step 2). If the UE and network support inter-RAT cell change order to GERAN and the target cell is GERAN, the eNB can trigger an inter-RAT cell change order (optionally with Network Assisted Cell Change (NACC)) to a GERAN neighbour cell by sending an RRC message to the UE (step 3a). On the other hand, if the UE or the network does not support inter-RAT PS handover from E-UTRAN to GERAN/UTRAN nor inter-RAT cell change order to GERAN or the network does not wish to use these procedures, the eNB can trigger RRC connection release with redirection to GERAN or UTRAN cell (step 3b). Or, if the UE and network support "RRC connection release with redirection and Multi Cell System Information to GERAN/UTRAN", the eNB can trigger RRC connection release with redirection to GERAN or UTRAN and include one or more physical cell identities and their associated system information (step 3c). In a word, the eNB may include the redirection information into the RRC connection release message or uses the cell change order to redirect the UE from the E-UTRAN cell to the GERAN or UTRAN cell.

After the UE is redirected to the legacy cell (e.g. GSM, UTRAN or CDMA2000 cell), the UE shall establish a RRC connection and establish the signaling connection by sending an RRC Initial Direct Transfer message that contains a NAS message (step 6). Then, the UE continues with the MO call setup procedure with sending Connect Management (CM) Service Request (step 9). In the prior art, the UE can only cancel the call initiation after the RRC connection is established, which takes time for the call clearing due to completion of the RRC connection establishment, and wastes transmission power. However, with the present invention, after the UE is redirected (e.g. by RRC connection release or cell change order) to the legacy cell, the UE can cancel the call initiation by abortion of a RRC connection establishment. In other words, the UE does not perform RRC connection establishment to the legacy network, so that the UE does not have to wait to send a DISCONNECT message to the legacy network for the call clearing, which is sent only if the RRC connection to the legacy cell is established and the CM Service Request is sent. Thus, time for the RRC connection establishment is saved, so as the transmission power for the RRC connection establishment.

Note that, the cancellation may be triggered by a user of the UE via a user interface (e.g. a dialer application). The UE NAS layer receives a request from the user interface and sends a cancellation request to the UE RRC layer. Thus, the RRC layer stops performing the RRC connection establishment for call clearing. Further, after aborting the RRC connection establishment, the UE selects back the LTE cell to camp on from the legacy network if the UE has PS access ongoing (e.g. messaging service, youtube) during call cancellation. Or, after aborting the RRC connection establishment, the UE stays in the legacy cell to camp on. The UE may stay in the legacy cell to camp on if the UE does not have PS access ongoing (e.g. messaging service, youtube) during call cancellation. Therefore, the UE can quickly make another CS call in the legacy network since the legacy network supports CS call.

Figure 5:
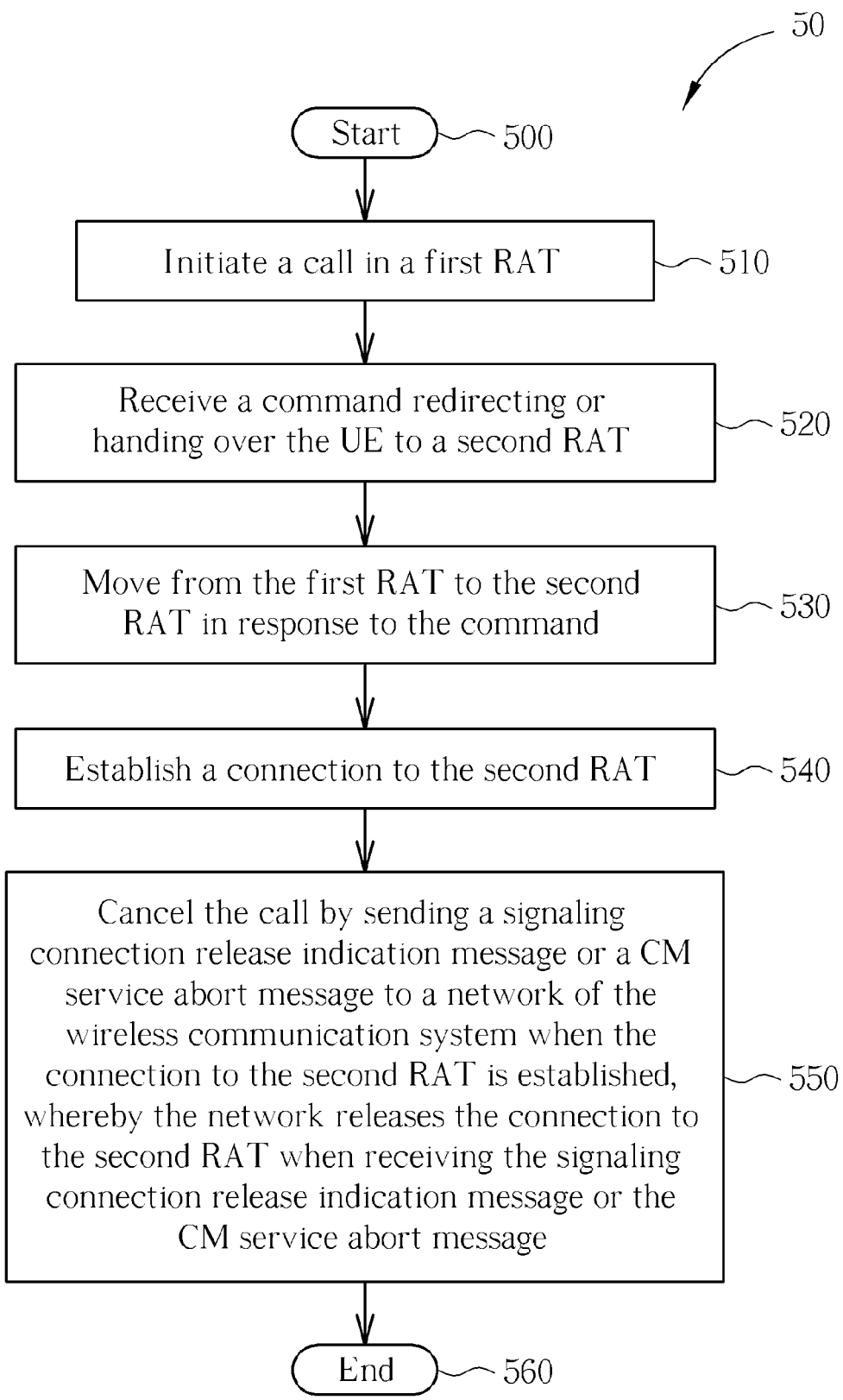
FIG. 5 is a flowchart of an exemplary process.

Please refer to FIG. 5, which illustrates a flowchart of an exemplary process 50. The process 50 is utilized in a UE for call clearing in inter-RAT change. The process 50 can be compiled into the program code 214 and includes the following steps:

Step 500: Start.

Step 510: Initiate a call in a first RAT.

Step 520: Receive a command redirecting or handing over the UE to a second RAT.

Step 530: Move from the first RAT to the second RAT in response to the command.

Step 540: Establish a connection to the second RAT.

Step 550: Cancel the call by sending a signaling connection release indication message or a CM service abort message to a network of the wireless communication system when the connection to the second RAT is established, whereby the network releases the connection to the second RAT when receiving the signaling connection release indication message or the CM service abort message.

Step 560: End.

According to the process 50, the UE initiates the call in the first RAT and moves to the second RAT for the call due to a command received from the first RAT, and then establishes a connection to the second RAT. The UE cancels the call initiation by sending a signalling connection release indication message or a CM service abort message to the network (i.e. UTRAN) when the connection to the second RAT is established. Note that, the signalling connection release indication message or the CM service abort message is used for the call clearing in an earlier stage than the DISCONNECT message (i.e. in a normal case, the DISCONNECT message is sent only after the CM Service Request), so as to speed up the call clearing, and save the transmission power consumption.

Take an example based on the process 50. A UE initiates a call by CS fallback in an E-UTRAN cell. The UE is redirected (e.g. by RRC connection release or cell change order) to or handover to the legacy cell (e.g. GSM, UTRAN or CDMA2000 cell) of a legacy network. The UE selects the legacy cell and establishes a RRC connection successfully to the legacy cell either by sending a RRC Initial Uplink Direct Transfer or handover complete (e.g. handover to UTRAN complete if the legacy cell is a UTRAN cell). Therefore, the UE can cancel initiating the call by sending the signalling connection release indication message or CM service abort message. In response to reception of the signalling connection release indication message or CM service abort message, the network releases the RRC connection of the UE.

The cancellation is triggered by a user via a user interface (e.g. a dialer application). The UE NAS layer receives a request from the user interface and sends a cancellation request to the UE RRC layer. Therefore, the UE RRC layer sends the signalling connection release indication message or CM service abort message for the call clearing. Note that, the signalling connection release indication message may be used for releasing signaling connection only for the CS domain, so that a connection for the PS domain may be maintained for transmission/reception. Moreover, the signalling connection release indication message may be sent right after the RRC Initial Direct Transfer message that contains a NAS message, so as to quickly end the call initiation. In addition, the CM service abort message may be sent right after the UE has sent the CM service request message (referring back to FIG. 4). With such manner, the UE is able to cancel the call initiation in an earlier stage than the stage of sending the DISCONNECT message.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the present invention provides a method for canceling a call initiation in inter-RAT change. The UE cancels the call initiation by abortion of the RRC connection establishment or by signalling connection release indication message/CM service abort message, so as to reduce the time for the call clearing and saving the UE power.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for canceling a call initiation in radio access technology, hereafter called RAT, change for a mobile device, the method comprising:
   initiating a circuit-switched (CS) fallback call in a first RAT by sending a non access stratum (NAS) extended service request;
   receiving a command redirecting the mobile device to a second RAT; and
   canceling the CS fallback call in response to a request received from a user interface by aborting a connection establishment to the second RAT before establishing a connection to the second RAT when the mobile device is moving from the first RAT to the second RAT in response to the command;
   wherein the first RAT is long-term evolution (LTE), the connection is a radio resource control (RRC) connection or a signaling connection for CS domain, and the command is an inter-RAT cell change order or a RRC connection release.

2. The method of claim 1, wherein the step of canceling the CS fallback call in response to the request received from the user interface by aborting the connection establishment to the second RAT before establishing the connection to the second RAT when the mobile device is moving from the first RAT to the second RAT in response to the command comprises:
   canceling the CS fallback call in response to the request received from the user interface by aborting the connection establishment to the second RAT before establishing the connection to the second RAT when the mobile device is moving from the first RAT to the second RAT, when a user of the mobile device cancels the CS fallback call via the user interface to generate the request.

3. The method of claim 1, further comprising:
   selecting the first RAT to camp on after aborting the connection establishment.

4. The method of claim 1, wherein the step of canceling the CS fallback call in response to the request received from the user interface by aborting the connection establishment to the second RAT before establishing the connection to the second RAT when the mobile device is moving from the first RAT to the second RAT in response to the command comprises selecting a cell of the second RAT to camp on when the mobile device goes to idle mode in the first RAT.

5. A method for canceling a call initiation in radio access technology, hereafter called RAT, change for a mobile device, the method comprising:
   initiating a circuit-switched (CS) fallback call in a first RAT by sending a non access stratum (NAS) extended service request;
   receiving a command redirecting or handing over the mobile device to a second RAT;
   establishing a connection to the second RAT in response to the command; and
   canceling the CS fallback call in response to a request received from a user interface by sending a signaling connection release indication message or an connect management (CM) service abort message to a network of the wireless communication system when the connection to the second RAT is established, whereby the network releases the connection to the second RAT when receiving the signaling connection release indication message or the CM service abort message;
   wherein the first RAT is long-term evolution (LTE), the connection is a radio resource control (RRC) connection or a signaling connection for CS domain, and the command is an inter-RAT cell change order or a RRC connection release.

6. The method of claim 5, wherein the step of canceling the CS fallback call in response to the request received from the user interface by sending the signaling connection release indication message or the CM service abort message to the network of the wireless communication system when the connection to the second RAT is established comprises:
   canceling the CS fallback call by sending the signaling connection release indication message for CS domain to the network when the connection to the second RAT is established.

7. The method of claim 5, wherein the step of canceling the CS fallback call in response to the request received from the user interface by sending the signaling connection release indication message or the CM service abort message to the network of the wireless communication system when the connection to the second RAT is established comprises:

canceling the CS fallback call by sending the CM service abort message to the network when the connection to the second RAT is established and a CM service request message is sent to the network.

* * * * *